June 3, 1969   S. P. LELLOS   3,447,474
HYDRO-MECHANICAL POWER GENERATOR
Filed Dec. 12, 1967

INVENTOR
SOLON P LELLOS

BY Robert T Dunn
ATTORNEY

June 3, 1969 S. P. LELLOS 3,447,474
HYDRO-MECHANICAL POWER GENERATOR
Filed Dec. 12, 1967

INVENTOR
SOLON P. LELLOS
BY Robert T. Dunn
ATTORNEY

June 3, 1969

S. P. LELLOS 3,447,474

HYDRO-MECHANICAL POWER GENERATOR

Filed Dec. 12, 1967

INVENTOR
SOLON P. LELLOS

BY *Robert T. Dunn*

ATTORNEY

United States Patent Office 3,447,474
Patented June 3, 1969

3,447,474
HYDRO-MECHANICAL POWER GENERATOR
Solon P. Lellos, Nashua, N.H., assignor to Stored Energy Systems Corporation, Nashua, N.H., a corporation of New Hampshire
Filed Dec. 12, 1967, Ser. No. 689,907
Int. Cl. F04b 17/00; F03b 17/00
U.S. Cl. 103—68
10 Claims

ABSTRACT OF THE DISCLOSURE

A hydro-mechanical power generator is provided for converting water flowing down a gentle incline into useful power and consists of a large shallow reservoir located alongside or in the flowing stream of water and containing one or more buoys which fill most of the area of the reservoir. Water from an upstream point along said stream is directed into the reservoir to fill it raising the buoys and, subsequently, the reservoir is emptied into the stream at a downstream point lowering the buoys and so the buoys rise and descend cyclically doing work while descending on, for example, pumps which compel fluid under pressure into pressure storage vessels. The generator can operate on as little as five foot head of water and so a reservoir measuring one thousand feet square located in a river flowing on less than a one percent incline will produce energy at the rate of about twenty-five thousand kilowatts.

---

This invention relates to hydro-mechanical power generators and more particularly to a generator for converting the power of gently flowing water into a useful form which can be stored.

Heretofore, relative small buoyancy pumps have been suggested for forcing water from one level to a higher level. One such pump is described in U.S. Patent No. 1,551,653 entitled "Hydro-mechanical Transformer" which issued Sept. 1, 1925, to E. Fouchee. That patent describes a hydro-mechanical transformer for harnessing a waterfall to pump water. Heretofore, devices such as described in that patent have not had any practical use for harnessing the power of falling water. The water wheel and the water driven turbine employed in hydro-electrical dams have proven to be more practical, and where there is suficient head of water available (fifty feet or more) in a relatively short distance, the water wheel and the water turbine are unquestionably superior to the buoyancy pump for doing work and generating power.

It is one object of the present invention to provide a hydro-mechanical power generator which makes practical use of a water head substantially less than possible heretofore and generates a significant amount of power.

It is another object of the present invention to provide such a hydro-mechanical power generator wherein said water head is defined by an elevation difference between two relatively widely separated points on the ground.

It is another object of the present invention to provide such a hydro-mechanical power generator which derives power from water flowing down an incline in the range of one percent.

It is another object of the present invention to provide such a hydro-mechanical power generator which can supply energy to drive generators continuously as well as store large amounts of energy to be used on demand during peak load periods.

Various embodiments of the present invention contemplate a hydro-mechanical power generator employing some of the features of the gravity buoyancy pump which has had very little practical use in the past. Heretofore, it has been suggested that the gravity buoyancy pump of very modest size can be employed to pump water from one level to another. The above mentioned Fouchee patent describes such a pump and the details of the structure of the pump. Pumps of this sort have not met with success, because they have limited power and when constructed as described in the Fouchee patent, they have very low efficiency, because of the relatively great friction forces compared to the driving forces therein. Embodiments of the present invention employ the gravity buoyancy pump principle on a very large scale with structure such that the driving forces are relatively much greater with respect to the friction forces than in the gravity buoyancy pumps suggested in the past.

The large scale is an important feature of the applicant's invention and accommodates the advantage of employing the relatively low velocity flow of so many of the rivers and streams of the country which, heretofore, have served no purpose for generating power. The relatively large dimensions featured in the present invention provide a mechanism for generating power employing relatively gently flowing rivers which descend on a grade of one percent or even less and which needs no more than a five foot head of water for efficient useful operation.

Other objects and features of the present invention will be apparent from the following specific description taken in conjunction with the figures in which.

Figure 1:
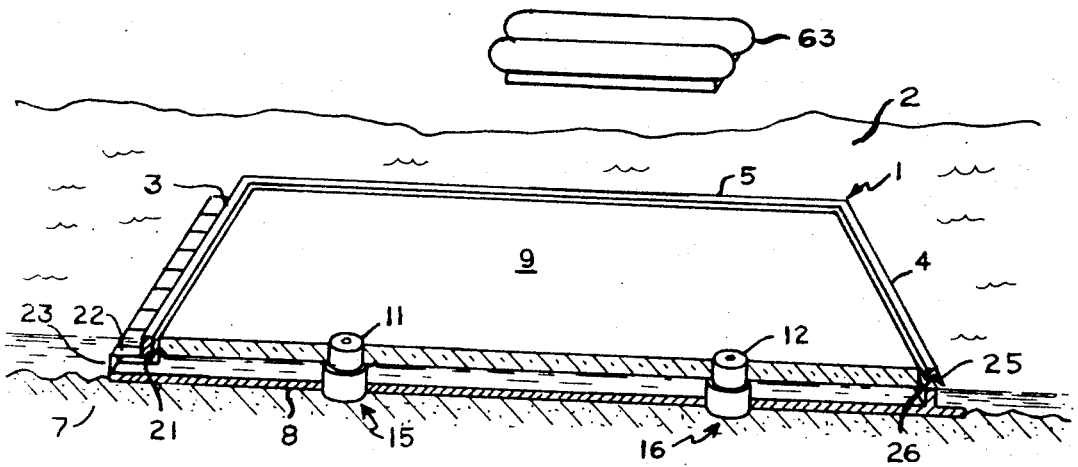
FIGURE 1 is a sectional isometric view of the hydro-mechanical power generator shown in FIGURE 2.

Turning first to Figure 1 there is shown a representative embodiment of the invention including a large reservoir 1 located in a river or stream 2 and formed of four walls, an upstream wall 3, a downstream wall 4 and side walls 5 and 6 connected thereto defining a rectangle or square of dimensions which are of the same order of magnitude as the width of the stream or may be wider. For example, the reservoir may measure one thonsand feet by one thousand feet, so that the area thereof is a million square feet.

The walls 3 to 6 of the reservoir 1 extend from the bed 7 of the river to above the high water level mark of the river and so all of the walls extend above the water level at all times. The bottom 8 of the reservoir rests on the river bottom and is preferably smooth and sealed so that river water does not flow into the reservoir except through control openings provided for that purpose.

Figure 2:
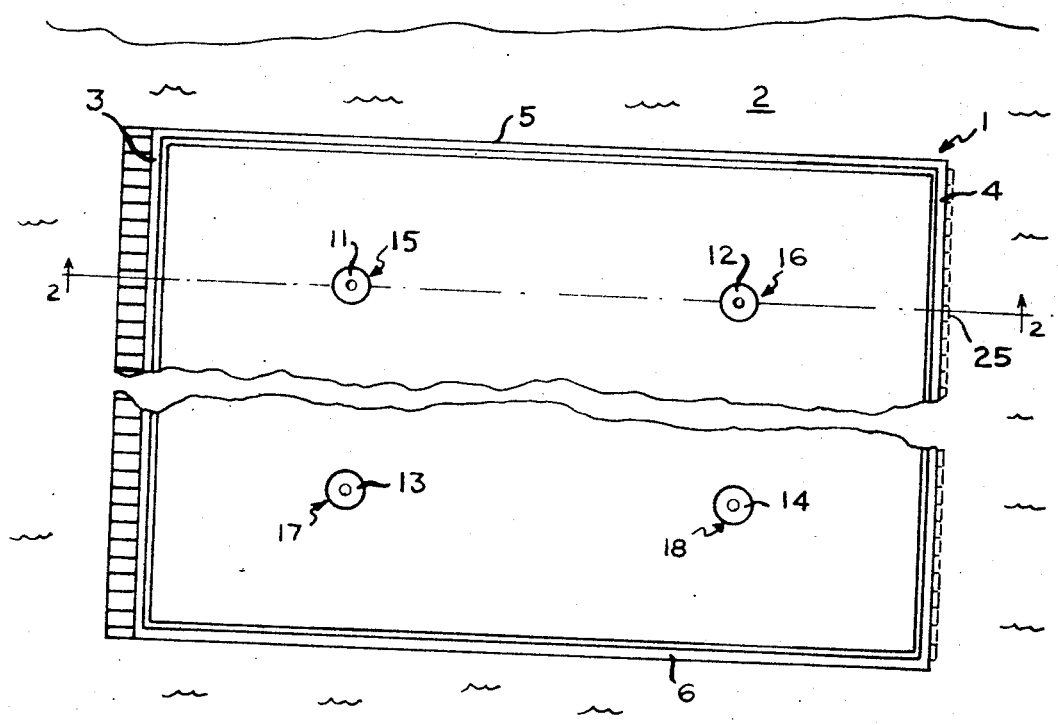
FIGURE 2 is a plan view of a hydro-mechanical power generator incorporating features of the invention.

Within the reservoir is located at least one buoy 9 of such area that it substantially fills the whole of the area of the reservoir. In FIGURES 1 and 2, a single rigid buoy 9 is shown which attaches directly to the plunger 11 to 14 of each of pumps 15 to 18, so that the plungers are forced downward when the buoy 9 descends and are raised upward when the buoy ascends.

Figure 3:
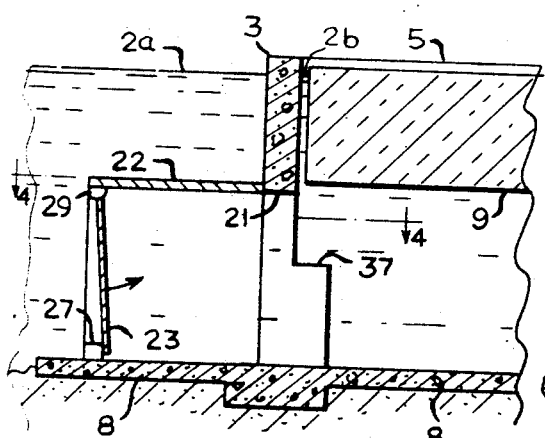
FIGURE 3 is a side sectional view of the upstream reservoir wall illustrating the gates for filling the reservoir.

The upstream wall 3 of the reservoir contains a great number of openings 21 which are below the river water line adjacent this wall. The openings 21 connect with tunnels 22 which extend upstream from the wall below the water line and which have filling gates 23 therein which are controlled and which permit water to flow from an upstream point in the river into the reservoir so that the reservoir is filled to a level substantially equal to the level of the river at the location of the gates. FIGURE 3 shows a typical one of these upstream filling gates and tunnels in section view.

Figure 4:
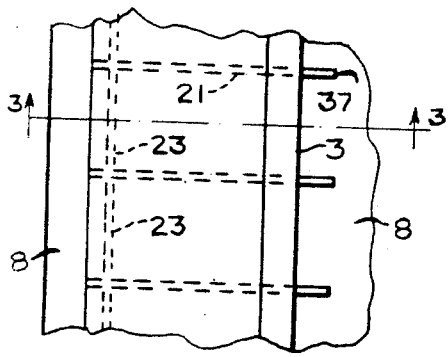
FIGURE 4 is a plan view of the upstream gates.

FIGURE 4 illustrates some of the upstream gates from a top view showing that they are as closely spaced as possible and that the openings 21 in the wall 3 account for a substantial portion of the total area of wall 3. Thus, when the filling gates 23 open, the reservoir 1 is very rapidly filled even though it is of huge size and accommodates a tremendous volume of water.

Figure 5:
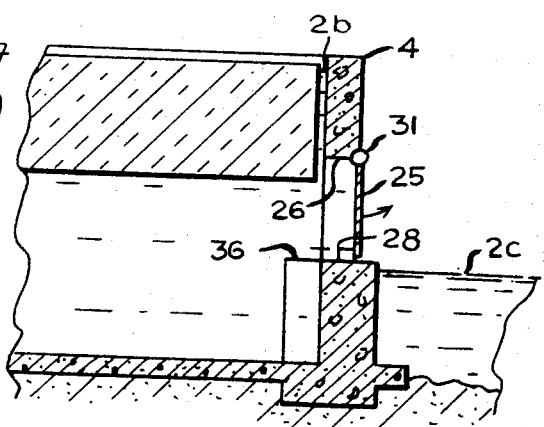
FIGURE 5 is a side sectional view of the downstream reservoir wall showing the emptying gates.

At the other end of the reservoir, the downstream wall 4 includes a great number of emptying gates 25 in openings 26 in the wall above the level of the river so that when these gates open, the reservoir empties to the level at the bottom of the gates. A sectional view of the wall illustrating one of the emptying gates is shown in FIGURE 5.

The gates 23 and 25 at opposite ends of the reservoir are operated cyclically so that they open and close substantially out of phase. When the upstream gates 23 open permitting water to flow into the reservoir so that the reservoir water level 26 rises to the upstream water level 2a, the downstream gates 25 are closed. When the reservoir is filled to a level substantially equal to the level 2a, the buoy 9 is floated to its highest position and then the gates 23 are all closed. Subsequently, the gates 25 open and the water level 2b in the reservoir falls to the downstream water level 2c which may be at the bottom of gates 25, lowering buoy 9 to its lowest position. Gates 23 and 25 are held closed by positive latching devices 27 and 28, respectively, and which may be electrically controlled. When the latch 27 releases gate 23 to fill the reservoir 1, the latch 28 holds gate 25 closed. After the reservoir is filled and the inrushing water current subsides, the gate 23 swings closed with the aid of torsion spring 29 at the pivot of the gate and the latch 27 engages the gate 23. Then the latch 28 releases gate 25 and the outrushing current of water forces gate 25 to open and water flows out of the reservoir into the river at the level 2c which may be substantially equal or lower than the level 2b in the reservoir. When the reservoir water level 2b and the downstream level 2c are about equal, the gate 25 is swung closed by the torsion spring 31 at its pivots and the latch 28 engages gate 25. Then the cycle starts again.

The electrical signals which control the latches 27 and 28 may be derived from level sensing devices within or from outside of the reservoir or from position sensing devices attached to the pumps 15 to 18, or a very simple electrical system can be employed operating as follows: (1) Initially, gate 25 is engaged by latch 28 while gate 23 is free and is not engaged by latch 27, (2) Water flows into the reservoir filling it to a level substantially equal to the level 2a, at which time the gate 23 swings down by light spring action at its pivot and contacts latch 27 actuating a switch which causes latch 27 to engage gate 23 and also initiates another electrical signal which is fed to latch 28 releasing gate 25, (3) Water flows out of the reservoir down to the downstream level 2c, (4) As water ceases flowing out of the reservoir, the gate 25 swings closed contacting a switch on latch 28 which energizes the latch causing it to engage the gate 25 and initiates another electrical signal which is fed to latch 27 causing it to release gate 23. Thus, the cycle commences again and the gates 23 and 25 are opened and closed as necessary without requiring a sensing device for sensing the level of water in the reservoir or the position of the plungers in the pumps.

Figure 6:
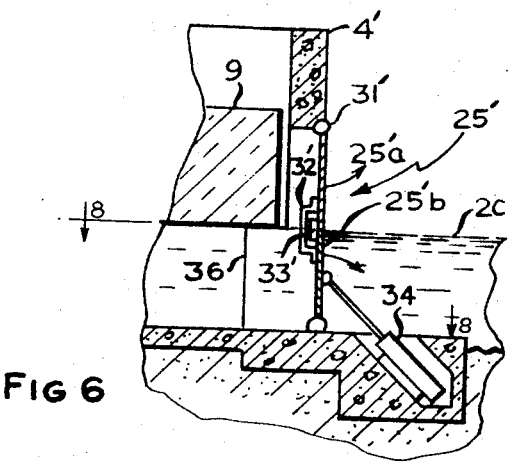
FIGURES 6 and 7 are side sectional views of another embodiment of the downstream reservoir wall showing the gates closed and open respectively.
Figure 7:
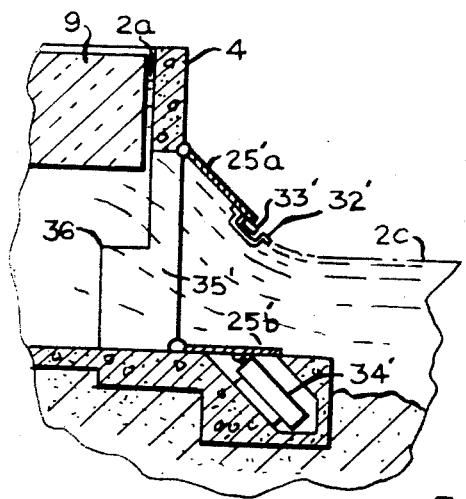
Figure 8:
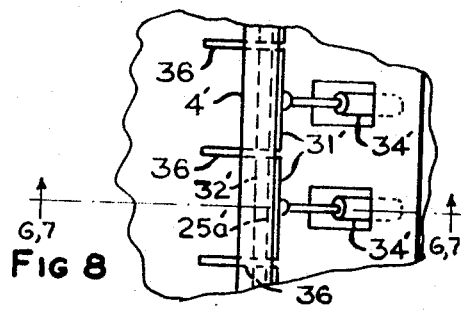
FIGURE 8 is a top view of the downstream gates of FIGURE 6.

Another embodiment incorporates a different emptying gate structure shown in FIGURES 6 to 8. FIGURES 6 and 7 show a typical one of the emptying gates in the closed and open positions, respectively. The emptying gate 25' is formed in top and bottom sections 25'a and 25'b. A stop 32' carried on top section 25'a and latch 33' serve to latch the two sections together when they are closed as shown in FIGURE 6. Section 25'a closes by gravity and the aid of a torsion spring 31' and, upon reaching a closed or partially closed position, triggers a switch which controls actuation of a hydraulic or pneumatic actuator 34' which closes the bottom section 25'b. Thus, top section 25'a closes first and then bottom section 25'b closes and the connecting latch 33' locks them together. In still another version, the bottom section 25'b can be made to close first and, thus, allow the top section 25'a to close second.

When the gate 25' opens as shown in FIGURE 7, water flows out of the reservoir through the opening 35' covered by the sections 25'a and 25'b of the gate. The top of this opening 35' is above the downstream water level 2c and the bottom is substantially below level 2c. The water level in the reservoir denoted 2b, cannot descend below level 2c; however, water in the reservoir, including water below level 2c, is now free to flow out of the reservoir in a more rapid continuously unobstructed fashion until the water level 2b of the reservoir lowers itself to, or approximately to, the downstream water level 2c. Consequently, the gate 25' which opens as much as gate 25 above the level 2c and, in addition, opens below the level 2c will lower the reservoir faster than gate 25.

Inside emergency buoy stops 37 and 36 are built into the upstream and downstream wall support columns, respectively. An equal number of similar stops are built against side walls 5 and 6 (shown in FIGURE 1) to make up a complete inside perimeter of such stops. The buoy 9 will come to rest on top of these stops only in case of an emergency such as may occur when the outlet gates 25 malfunction and stay open and at the same time level 2c happens to be below its normal level.

Another purpose of the supports 37 and 36 is to support the buoy when it is being built in place, in dry dock, and to support the buoy when maintenance or inspection is required.

The cyclic rising and descending of the massive buoy 9 is capable of generating substantial power. For example, if the reservoir 1 has an area of about one million square feet and the difference between the river levels 2a and 2c is about five feet, the descending stroke of the buoy 9 can generate an average power output of about twenty-five thousand kilowatts continually for a substantially indefinite period. This results in a production of about six hundred thousand kilowatt hours per day.

The reciprocating action of the buoy 9 is readily turned into energy which can be stored by employing air or water pumps driven by the buoy. The air or water pumps 15 to 18 may compress gas in storage cylinders to a storage pressure of, for example, 400 p.s.i. and gas is drawn from these cylinders to drive turbines for producing electric power as it is required by the community and industry.

Figure 9:
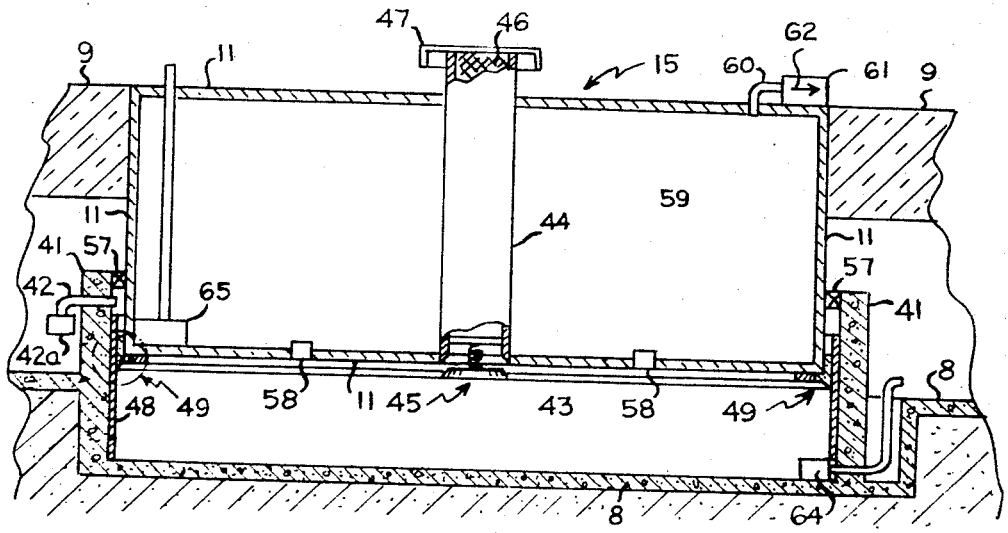
FIGURE 9 is a sectional view showing an air pump driven by a buoy in the reservoir for pumping air into storage tanks.

FIGURE 9 illustrates in sectional view the one or more air pumps driven by the buoy, such as one of the pumps 15 to 18 in FIGURES 1 and 2. The air pump shown in FIGURE 9 includes a plunger 11 which measures approximately 27 feet in diameter and projects into a cylinder 41 of reinforced concrete which extends into the river bed 7 beneath the reservoir.

Intake air flows into the compression chamber 43 of the pump through the intake tube 44 which extends from above the buoy 9 through the center of the plunger 11 and opens into the chamber 43 through a check valve 45. A filter 46 and cap 47 at the other end of the intake tube 44 filters the intake air and prevents precipitation from entering the chamber 43.

The outer perimeter of the plunger 11 forms an air tight seal against the sleeve 48 on the inside of the cylinder. For this purpose the Teflon seal ring assembly 49 is provided and shown in an enlarged view in FIGURE 10. Many other variations of this type of seal, and of other sealing methods do exist, but for reasons of simplicity only one method is described herein. The Teflon seal ring assembly includes a multitude of bolts such as bolt 51 which is welded to the plunger 11 and projects from the bottom thereof around its perimeter. These bolts carry the Teflon seal retaining ring 52 which is of substantially the same diameter as the plunger 11 and is shown in cross section in FIGURE 10.

Figure 10:
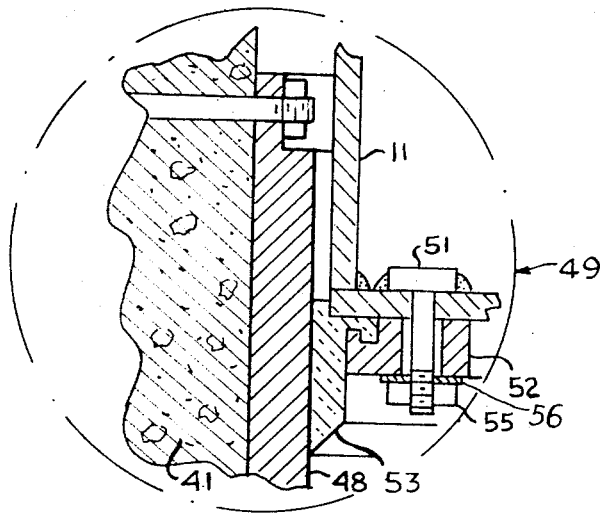
FIGURE 10 is a sectional view showing the gasket seal between the pump plunger and cylinder.

The Teflon seal ring 53 also shown in cross section in FIGURE 10 is mounted to the retaining ring 52 by interlocking therewith as shown in the figure and then the retaining ring and seal are fitted to the bolts 51 and secured by nuts and washers 55 and 56. The Teflon seal ring 53 is substantially wedge shaped and projects downward as shown in FIGURE 10, the wedge projection being of sufficient length so that the seal can flex and the wedge shaped portion can bend outward by the force of air within the chamber 43. Thus, the compression forces within the chamber 43 compel the seal to seal itself firmly against the sleeve 48 in the cylinder so that an air tight seal is made therebetween. In addition to this, a partial seal 57 is effected between the cylinder 41 and the plunger 11 above the Teflon seal to prevent dirt, small stones, etc. from lodging between the piston 11 and cylinder 41 and to wipe clean the piston during each stroke.

The span between partial seal 57 and the full Teflon seal shown in FIGURE 10 is vented to the reservoir by several conduits 42 having a strainer or filter 42a at the end thereof in the tank. This vent compensates for water pressure differential between the space and the reservoir which would tend to cause flow through the partial seal.

In a preferred embodiment the air compressed in compression chamber 43 is stored inside the plunger 11 and for this purpose a number of one way admission valves 58 are provided at the bottom of the plunger which permit compressed air to flow from the compression chamber 43 to the storage chamber 59 inside the plunger, but block flow from the storage chamber to the compression chamber. Thus, the plunger serves a dual purpose; it compresses and stores the gas and also affords minimum pressure loss in conduits between the compression and storage.

Another advantage of this structure is that machinery and equipment for utilizing the stored gas to generate electric power can be contained on the buoy 9 immediately above or adjacent the plungers. Thus, an electric power generator system is provided which is completely contained and carried by the buoy and this system adds to the weight of the descending stroke of the buoy.

The gas storage can also be accomplished in another manner. For example, a high pressure air duct 60 containing a check valve 61 which permits high pressure air flow only in the direction of the arrow 62 conducts higher pressure air from the high pressure tank 59 or directly from the chamber 43 to storage tanks 63 shown in FIGURE 2, which may be located adjacent the river.

The compression chamber 43 is also equipped with means 64 for automatically draining off water from the chamber which may be formed during the compression cycle or which may leak into the chamber on the upstroke. A similar means 65 is provided for ejecting water which may collect in the storage chamber 59. Both of these means 64 and 65 include a mechanism for detecting water level in the associated chamber and opening a one way valve through which the water is forced by the pressure in the chamber, and so the water is ejected rapidly. Structure such as this or other suitable structure known in the art can be used to clear the chambers of water.

In operation, on the up stroke of the buoy 9, air is drawn through the vent 44 into the compression chamber 43 and the check valve 58 prevents high pressure air from the storage chamber 59 from flowing back into the chamber 43. On the down stroke of the buoy 9, with the air intake check valve 45 closed, the air in chamber 43 is compressed and as compression increases with the down stroke, the pressure in chamber 43 eventually exceeds the pressure in the storage chamber 59 and so the check valve 58 opens permitting a certain volume of compressed air to flow from the chamber 43 into the storage chamber 59.

Figure 11:
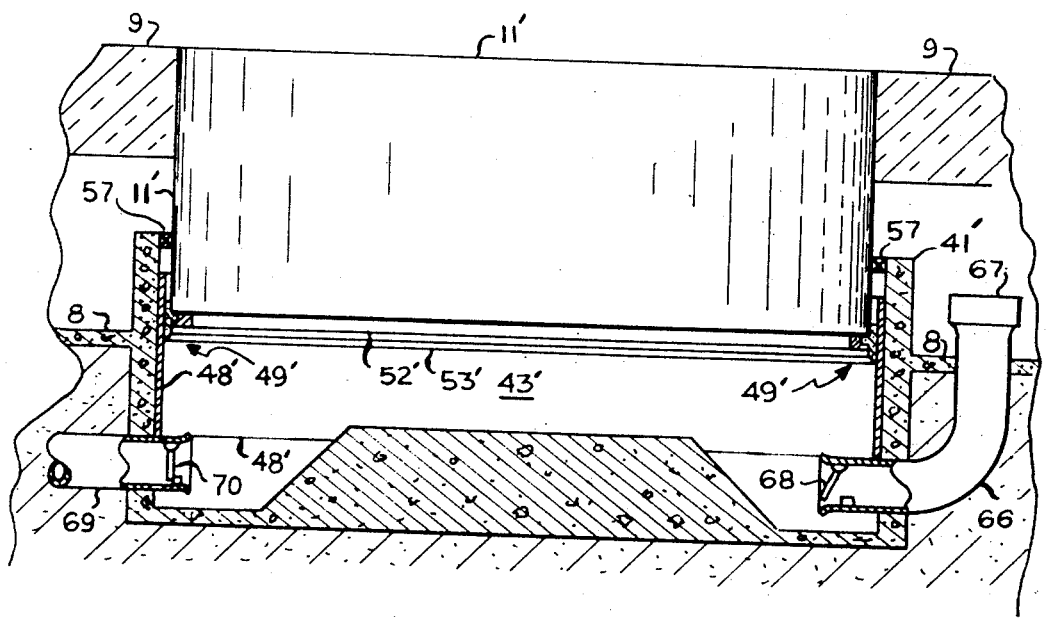
FIGURE 11 is a sectional view of a water pump driven by the buoy in the reservoir for pumping water to high pressure.

FIGURE 11 illustrates in section view a water pump which may be driven by the buoy 9. The plunger 11' of the water pump projects into the water pump cylinder 41' which is sunk into the river bed 7. A liner sleeve 48' on the inside of the cylinder is engaged by a seal 49' attached to the periphery at the lower end of the plunger 11'. This seal 49' may be constructed substantially as described above with reference to FIGURES 9 and 10.

Water flows into the water chamber 43' of the water pump through intake ducts such as intake duct 66, whose entrance is capped with strainer 67. The duct 66 connects the chamber 43' with the reservoir 1 and contains a gate 68 which swings open when the pressure in the duct 66 is greater than the pressure in the chamber 43'. This occurs on the up stroke when the buoy compels the plunger 11' to move upward. The output water duct 69 contains a gate 70. Gate 70 opens when the pressure in the chamber 43' is greater than the pressure in the duct 69. Thus, water flows out of duct 69 when the plunger 11' descends due to descent of the buoy 9.

When the plunger 11' starts to descend valve 70 will open and a substantial fraction of the volume of water in the chamber 43' is then delivered at high pressure to the duct 69 and may be used to do work for any number of useful purposes. For example, the high pressure water from duct 69 may be transferred to a higher elevation and stored in a reservoir for later use or immediate use, or it may be employed to compress gas in storage tanks, thereby storing the work of the water pump. Immediate use of the high pressure water from duct 69 can be accomplished with a hydraulic motor driven by the high pressure water. The hydraulic motor would drive an electric generator.

Quite clearly, with proper alterations to the walls so as to retain the desired differences in water levels 2a and 2c, the vertical areas of side walls 5 and 6 could also be made into inlet and outlet gates such as, or similar to, the gates in walls 3 and 4. This would greatly increase the stroke rate and so output power would be increased.

The buoyant structures described herein particularly with reference to FIGURE 2 includes rigid structures which overlay the reservoir. In FIGURE 2, the buoy 9 is shown as a uniform body which is both bouyant and rigid and may be ballasted with the readily available water. This example shows but one suitable buoy structure. Quite clearly others could be employed without deviating from the spirit and scope of the invention. For example, a plurality of superstructures having the necessary weight and floated by non-rigid buoys could be substituted for the single rigid buoyant buoys shown in the figures, or a greater number of rigid or non-rigid buoys could be employed to float such superstructures and drive the compressors.

What is claimed is:

1. A hydro-mechanical power generator for converting a river of relatively gently gravity flowing water into useful power comprising,
 a reservoir for water located in the river and having dimensions of length and breadth much greater than the depth thereof of the same order of magnitude as the width the river,
 a gate at the upstream end of the reservoir which opens substantially to the bottom thereof for filling said reservoir to an upstream level of the river,
 a gate at the downstream end of the reservoir which opens from substantially above to at least the level of the river at the downstream end for emptying said reservoir to the downstream level of said river, buoyant means in said reservoir which substantially fills the length and breadth dimensions thereof, means responsive to cyclic input mechanical actuation for doing work, means for coupling said buoyant means to said means for doing work, and means for controlling said filling and said emptying gates, whereby said buoyant means moves up and down cyclically causing said responsive means to do work cyclically.

2. A hydro-mechanical power generator as in claim 1 and in which, said filling and said emptying gates are controlled so that they open and close during filling and emptying intervals which are substantially out of phase.

3. A hydro-mechanical power generator as in claim 2 and in which, said filling gate is located in said river and opens generally below the river water level at the upstream end of said reservoir, and said emptying gate is located in said river and opens generally above the water level at the downstream end of said reservoir.

4. A hydro-mechanical power generator as in claim 1 and in which, said filling gate includes an underwater conduit which extends from said reservoir up said river to the opening part of said gate.

5. A hydro-mechanical power generator as in claim 1 and in which, the elevation difference between said river water levels at the filling and emptying gates is between 5 feet and 15 feet.

6. A hydro-mechanical power generator as in claim 1 and in which, said downstream gate opens from substantially above the level of the river at the downstream end to the bottom of the reservoir.

7. A hydro-mechanical power generator as in claim 1 and in which, said means for doing work includes at least one water pump having a relatively stationary part thereof supported by the reservoir and a moveable part attached to the buoyant means.

8. A hydro-mechanical power generator as in claim 1 and in which, said filling and emptying gates open from substantially the bottom of the buoyant means and downward when the buoyant means is at its uppermost position.

9. A hydro-mechanical power generator as in claim 1 and in which, said means for doing work includes at least one air pump having a relatively stationary part thereof supported by the reservoir and a moveable part attached to said buoyant means.

10. A hydro-mechanical power generator as in claim 9 and in which, said air pump stationary part is a cylinder in which air is compressed and said moveable part is a plunger for compressing air in said cylinder, and means are provided for conducting compressed air from said cylinder into said plunger wherein said compressed air is stored.

References Cited

UNITED STATES PATENTS

| | | | |
|---|---|---|---|
| 939,506 | 11/1909 | Hubmann | 103—56 XR |
| 962,382 | 6/1910 | Osborn | 253—18 |
| 1,773,189 | 8/1930 | Lecrenier | 253—18 |

ROBERT M. WALKER, *Primary Examiner.*

U.S. Cl. X.R.

253—18